(12) United States Patent
Shotey et al.

(10) Patent No.: US 6,384,354 B1
(45) Date of Patent: May 7, 2002

(54) COVER FOR ELECTRICAL SWITCH

(76) Inventors: Michael Shotey, 7272 E. Gainey Ranch Rd., #29 Scottsdale, AZ (US) 85258; Michael McConnaughy, 19516 N. 71st Ave., Glendale, AZ (US) 85308; Edgar W. Maltby, 2063 Leisure World, Mesa, AZ (US) 85206

( * ) Notice: Subject to any disclaimer, the term of this patent is extended or adjusted under 35 U.S.C. 154(b) by 0 days.

(21) Appl. No.: 09/479,805

(22) Filed: Jan. 8, 2000

(51) Int. Cl.[7] .............................................. H01H 13/04
(52) U.S. Cl. ...................................... 200/333; 200/339
(58) Field of Search ................................ 200/331, 330, 200/339, 333

(56) References Cited

U.S. PATENT DOCUMENTS

| | | | |
|---|---|---|---|
| 3,188,438 A | * 6/1965 | Lovasco | 200/168 |
| 3,518,356 A | 6/1970 | Friedman | |
| 3,530,230 A | 9/1970 | Cormier et al. | |
| 3,544,703 A | 12/1970 | Jones | |
| 3,598,950 A | * 8/1971 | Ohashi | 200/167 A |
| 4,032,030 A | 6/1977 | Bass et al. | |
| 4,833,277 A | 5/1989 | Jacoby, Jr. et al. | |
| 5,290,983 A | * 3/1994 | Roberts et al. | 200/557 |
| 5,451,729 A | * 9/1995 | Onderka et al. | 200/18 |
| 5,595,289 A | * 1/1997 | Kurek et al. | 200/559 |
| 5,763,831 A | 6/1998 | Shotey et al. | |
| 5,998,747 A | * 12/1999 | Kelso et al. | 200/331 |

FOREIGN PATENT DOCUMENTS

| | | |
|---|---|---|
| JP | 5-342949 | * 12/1993 |

OTHER PUBLICATIONS

U.S. application No. 09/456,089, filed Dec. 6, 1999, Shotey et al.
34 UL 514 C–38, Dec. 26, 1996., pp. 34–35.
Pass & Seymour, "TradeMaster Weatherproof While–in–Use–Covers", Apr. 1999, Catalog No. WIUC20C.

* cited by examiner

Primary Examiner—P. Austin Bradley
Assistant Examiner—Nhung Nguyen
(74) Attorney, Agent, or Firm—Schmeiser, Olsen & Watts

(57) ABSTRACT

A cover for an electrical switch, wherein the electrical switch includes a yoke and a switch handle. In a first embodiment, which is particularly well suited for rocker-type switches, the cover comprises a handle cover sized and shaped to substantially conform to and fit over the switch handle. The handle cover has rotation points disposed parallel to an axis and including two planar surfaces, each of the planar surfaces being parallel to and passing through the axis. The cover also comprises a cover plate having a switch handle aperture for receiving the handle cover. The cover plate includes contact points for receiving the rotation points in movable relation. In an alternative embodiment, which is well suited for toggle switch applications, a cover is provided for an electrical switch, wherein the cover comprises a handle cover assembly including a handle cover member sized and shaped to substantially conform to and fit over the switch handle and a face member in which the handle cover member is slidably disposed. The handle cover member includes a handle cover which forms a cavity for receiving the switch handle. The cover further includes a cover plate having a handle cover aperture for receiving the handle cover assembly.

7 Claims, 21 Drawing Sheets

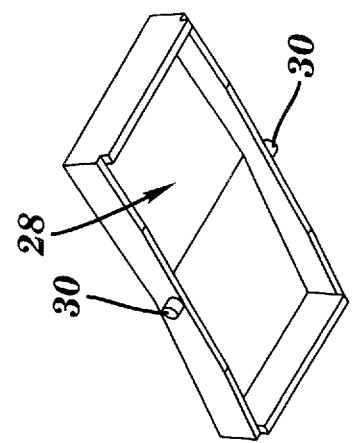
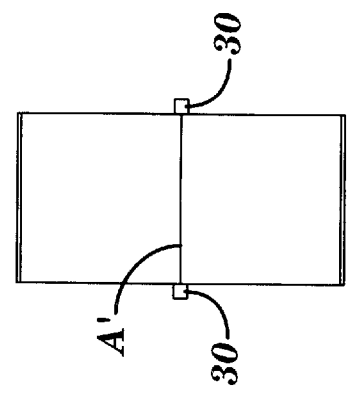
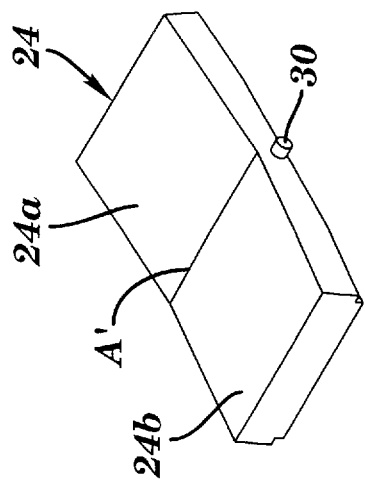
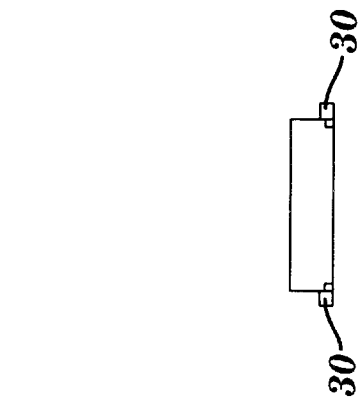
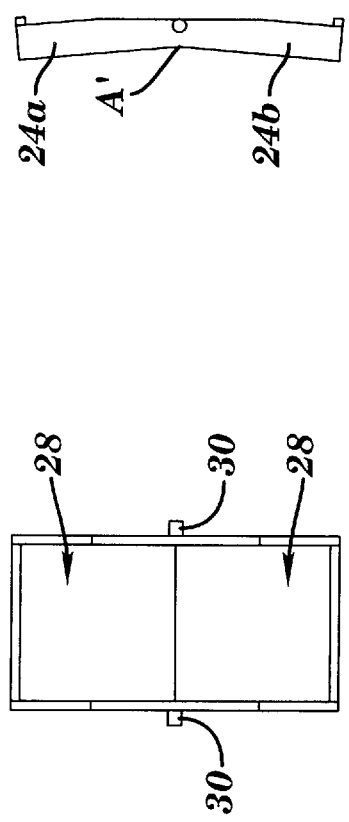
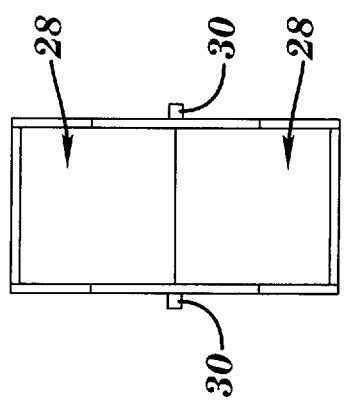

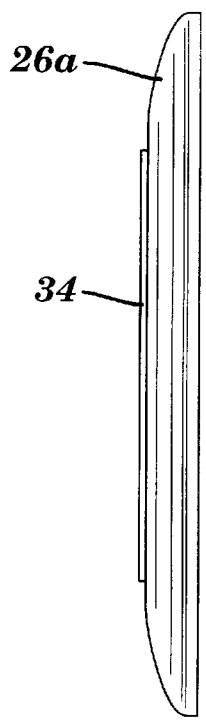
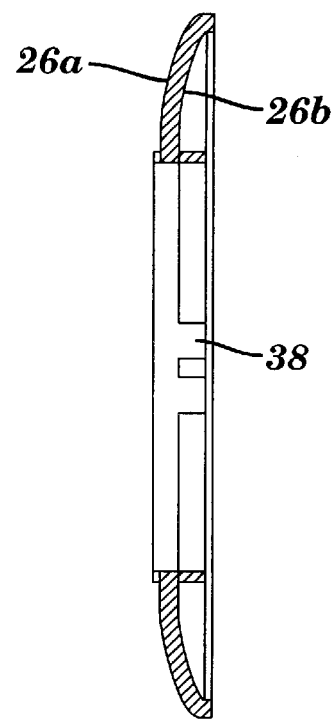
FIG. 19  FIG. 20
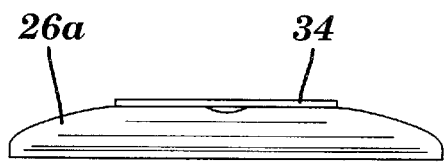
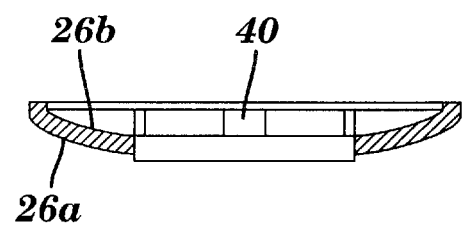
FIG. 21  FIG. 22

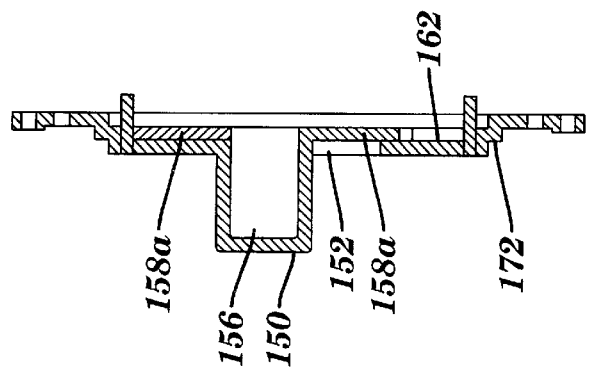
FIG. 31
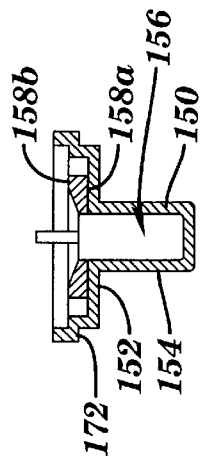
FIG. 33
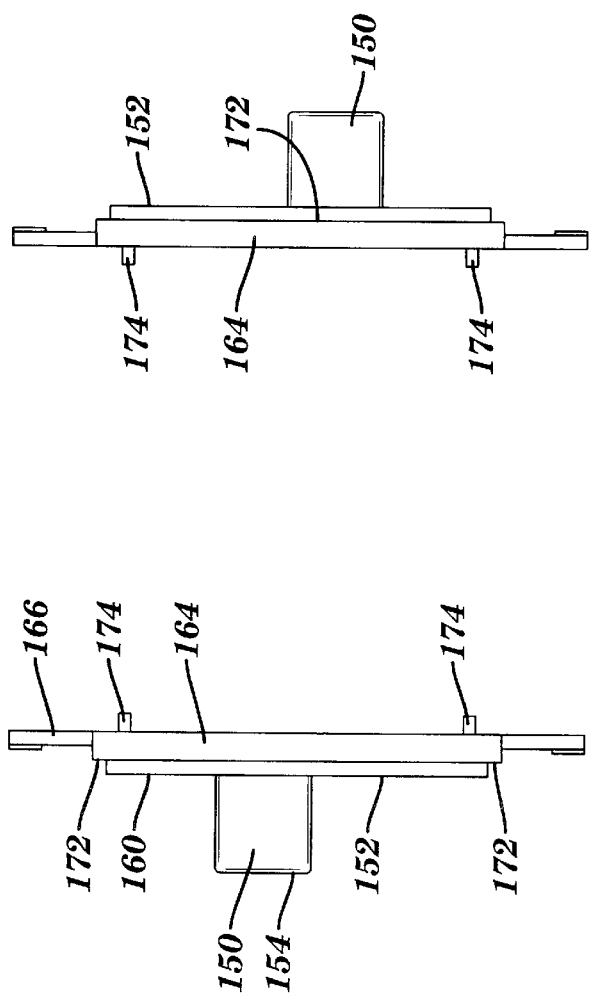
FIG. 30
FIG. 29
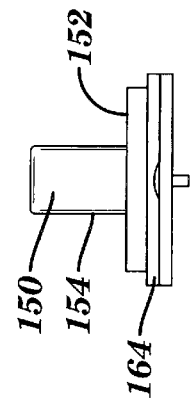
FIG. 32

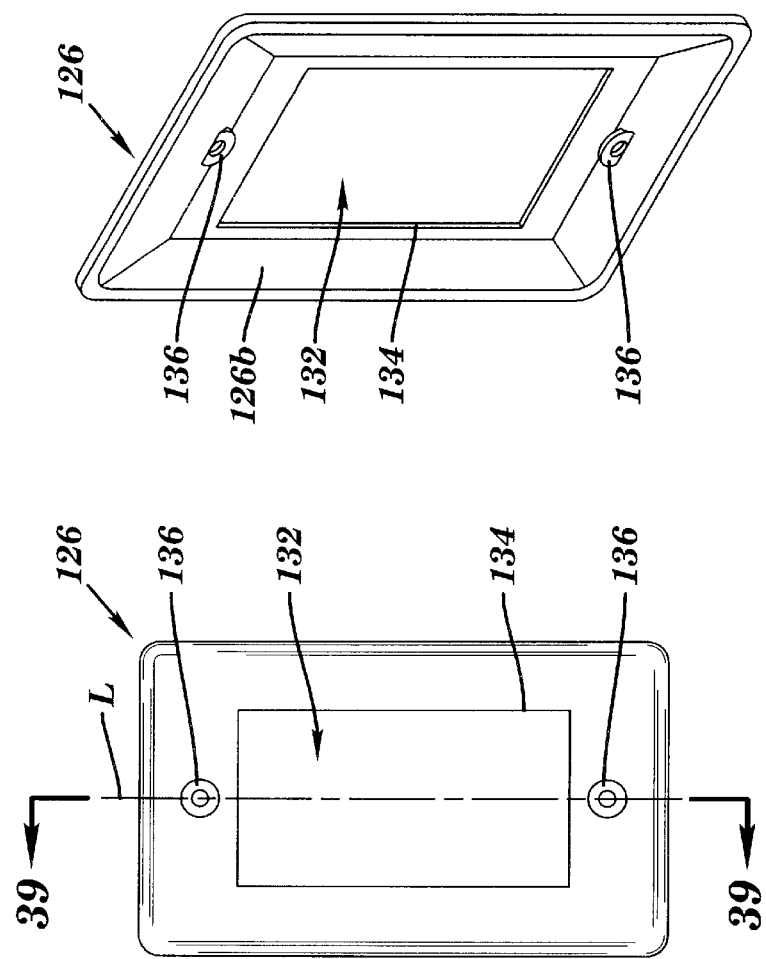
FIG. 36
FIG. 35
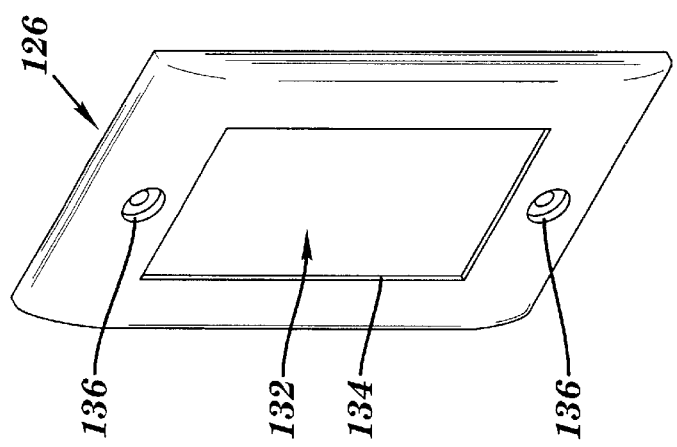
FIG. 34

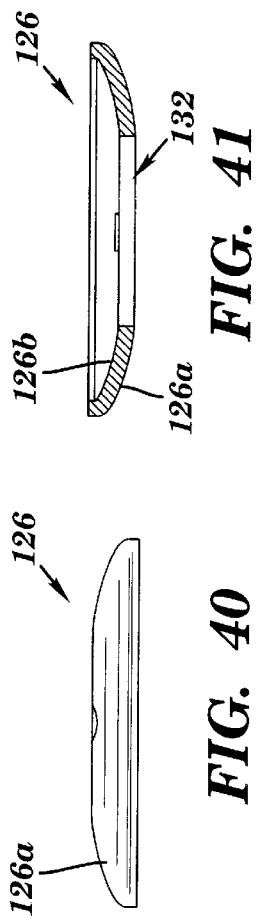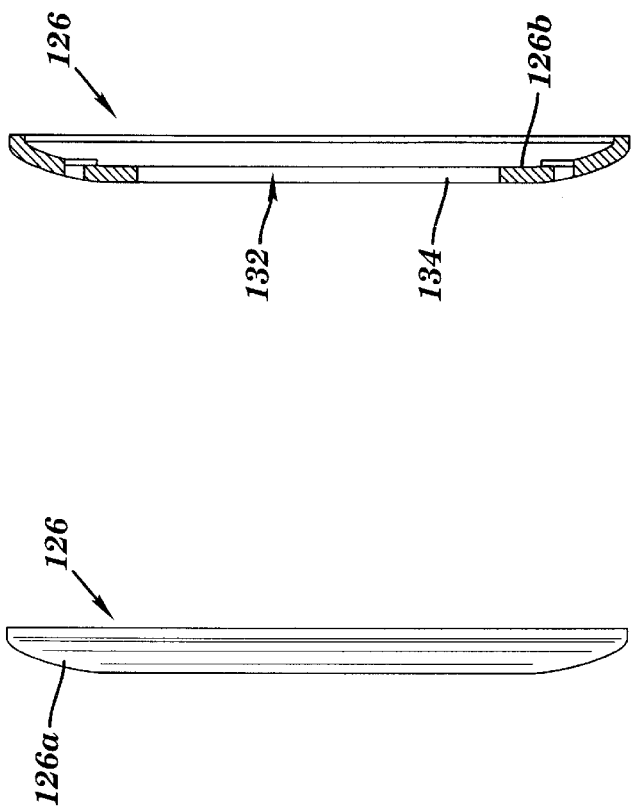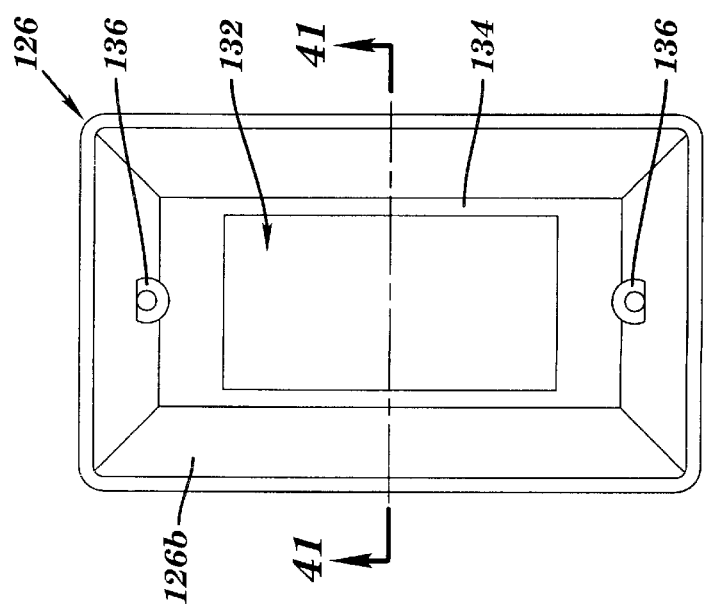

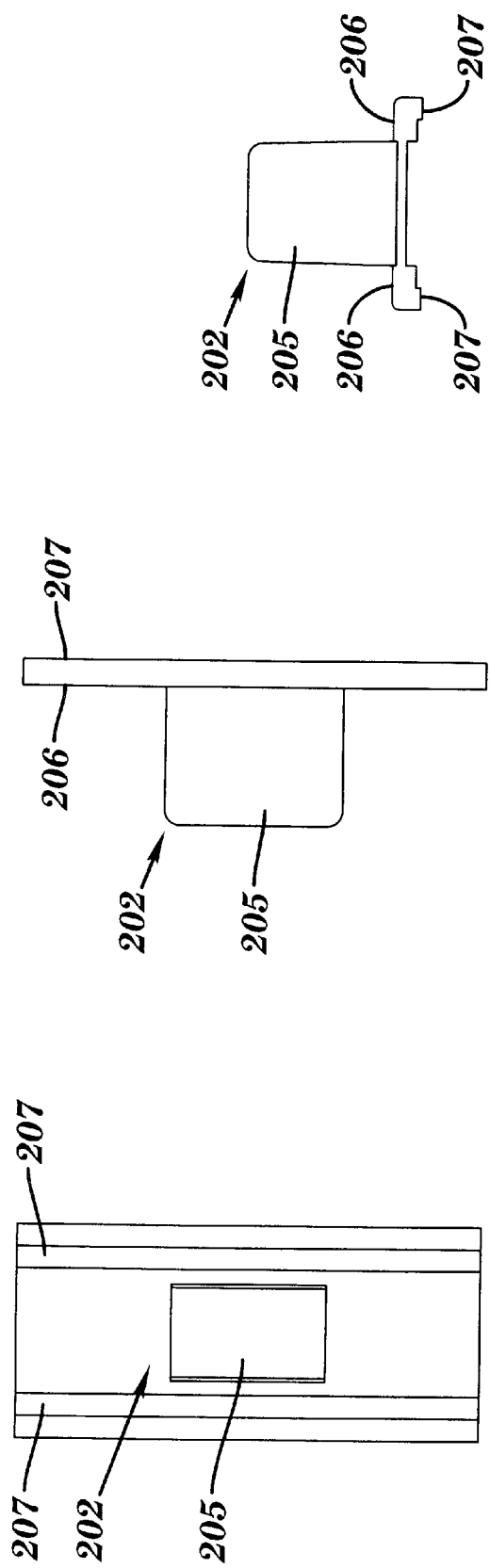

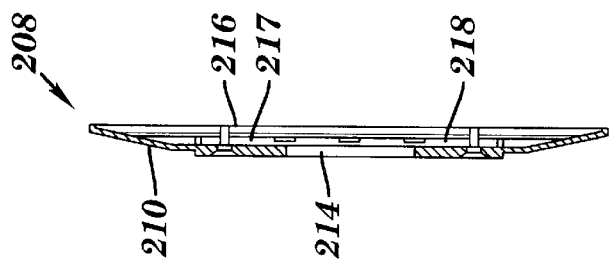
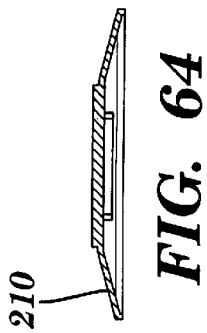
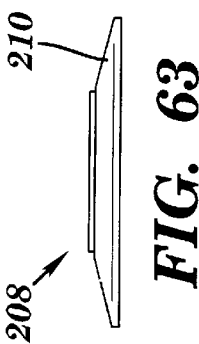
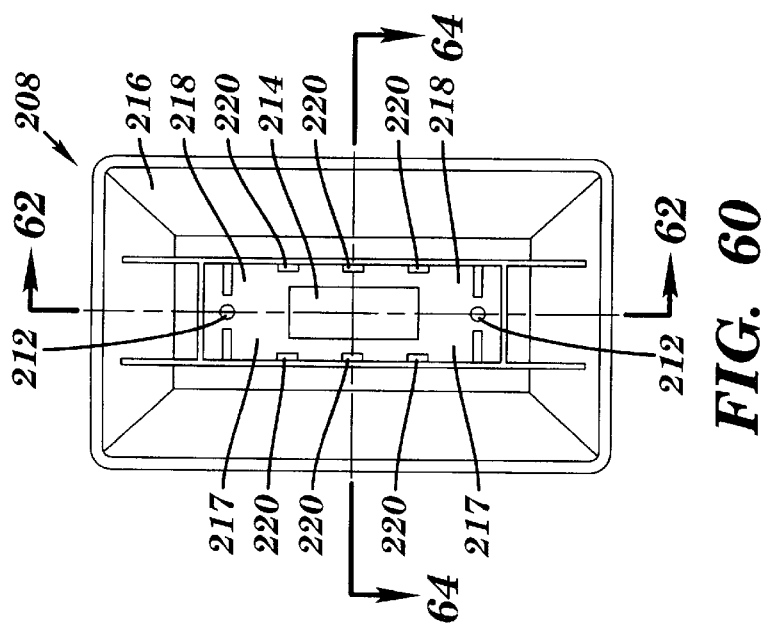

COVER FOR ELECTRICAL SWITCH

BACKGROUND OF THE INVENTION

1. Field of the Invention

The present invention relates generally to electrical switches for switching electrical appliances such as lights, fans, etc. on and off and, more specifically, to covers for electrical switches.

2. Description of the Related Art

Electrical switches such has those used in residential and commercial buildings to turn on and off lights, fans, etc. have been used for years and have undergone relative few design changes. Although various designs have been used in the past, two of such designs, i.e., the toggle switch and the rocker switch, are the most common.

In a standard toggle switch design, the switch includes a switch handle or toggle (i.e., an actuator) physically connected to a switching mechanism. The switch handle and switching mechanism are mounted to a yoke or backing plate. The switch handle and correspondingly the switching mechanism have two positions, i.e., an "on" position and an "off" position. When the handle is placed in or moved to the "on" position, contacts within the switching mechanism close to pass current and thereby cause the appliance to actuate. When the handle is toggled or moved to the "off" position, the contacts associated with the "on" position are opened, thereby turning off the appliance.

A rocker switch differs from a toggle switch primarily in the size and shape of the switch handle, and its path of movement. Whereas the switch handle of a toggle switch generally is thin and rectangular, typically measuring about 0.5 inches on a side and less than one inch long, a rocker switch typically includes two flat planes which join at a center or axial line. The planes typically are about one inch wide (along the axis), and each plane generally is about 1 to 1.25 inches long (perpendicular to the axis). The rocker portion of the switch thus is typically about 1 inch wide by about 2 to 2.5 inches long. The rocker is movably housed in a rectangular housing which generally comprises part of the backing plate or yoke.

Both toggle switches and rocker switches have been limited in some applications and for some users in that the size of the toggle or the rocker portion of the switch is too small. They also do not stand out far from the wall, which in some instances is disadvantageous. Moreover, in some instances the toggle or the rocker switch portion become marred, damaged, stained, or the like. Similarly, it may be desirable to change the color or appearance of the toggle or rocker switch portion, perhaps throughout a home or building. This can be relatively burdensome in that the individual electrical switches typically would have to be purchased, the old switches removed, including electrical disconnection, and the new ones installed. This can be time consuming and expensive.

3. Objects of the Invention

Accordingly, an object of the present invention is to provide a cover for an electrical switch that can effectively cover up an existing electrical switch, and can enlarge the size of the switch handle, e.g., the toggle or rocker portion of the switch.

Another object of the invention is to provide a cover for an electrical switch that affords a cost-effective means to change the appearance of an existing electrical switch.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a cover is provided for an electrical switch. The electrical switch comprises a yoke and a switch handle. The cover comprises a handle cover sized and shaped to substantially conform to, and fit over, the switch handle. The handle cover has rotation points disposed parallel to an axis and includes two planar surfaces, wherein each of the planar surfaces is parallel to and passes through the axis. The planar surfaces preferably lie in different planes. The cover plate according to this aspect of the invention has a switch handle aperture for receiving the handle cover. The cover plate includes contact points for receiving the rotation points in movable relation. Preferably, the rotation points comprise axles, and the contact points comprise bearings or axle bearings for rotatably receiving the axles.

The cover plate preferably includes a front surface that extends outwardly from the electrical switch. In some embodiments, the front surface includes at least one mounting aperture. Preferably the front surface is free of apertures other than the handle cover aperture and the at least one mounting aperture. In the presently preferred embodiments, the front surface of the cover plate in areas other than the handle cover aperture and the at least one mounting aperture is continuous and has uniform topography, and the cover plate is a single, solid component except for the blade apertures and the at least one mounting aperture.

According to an option for the invention, the handle cover includes a pair of longitudinal ends, the cover plate includes a back surface, and the back surface includes at least one guide for contacting one of the longitudinal ends to guide the handle cover during movement.

In accordance with another aspect of the invention, a cover for an electrical switch is provided. The cover comprises a handle cover assembly including a handle cover member sized and shaped to substantially conform to and fit over the switch handle and a face member in which the handle cover member is slidably disposed. The handle cover member includes a handle cover that forms a cavity for receiving the switch handle. The electrical switch cover according to this embodiment also includes a cover plate having a handle cover aperture for receiving the handle cover assembly.

In a preferred embodiment according to this aspect of the invention, the handle cover member includes a slide plate fixedly coupled to the handle cover. The face member preferably has a substantially rectangular face area, and may include at least one post for aligning the cover with the electrical switch. In some embodiments, the face member may include a yoke extension or, preferably, two such yoke extensions.

The cover plate includes a front surface which extends outwardly from the electrical switch. Preferably the front surface includes at least one mounting aperture, and the front surface is free of apertures other than the handle cover aperture and the at least one mounting aperture. Again, preferably, the front surface of the cover plate in areas other than the handle cover aperture and the at least one mounting aperture is continuous and has uniform topography, and the cover plate is a single, solid component except for the blade apertures and the at least one mounting aperture.

In accordance with another aspect of the invention, a cover is provided for an electrical switch, wherein the electrical switch includes a yoke and a switch handle. The cover comprises a handle cover sized and shaped to substantially conform to and fit over the switch handle. The handle cover includes a handle cover cavity for receiving the switch handle. The handle cover also preferably includes a slide plate fixedly coupled to the handle cover.

The cover also includes a cover plate having a handle cover aperture for slidably receiving the handle cover. Preferably but optionally, the cover plate includes a front surface that extends outwardly from the electrical switch, the front surface includes at least one mounting aperture, and the front surface is free of apertures other than the handle cover aperture and the at least one mounting aperture. In some embodiments, the front surface of the cover plate in areas other than the handle cover aperture and the at least one mounting aperture is continuous and has uniform topography. Preferably the cover plate is a single, solid component except for the handle cover aperture and the at least one mounting aperture.

In accordance with still another aspect of the invention, a cover is provided for an electrical switch, wherein the electrical switch includes a yoke and a switch handle. The cover according to this aspect of the invention comprises a handle cover sized and shaped to substantially conform to and fit over the switch handle. The handle cover includes a handle cover cavity for receiving the switch handle. The cover also includes a cover plate having a handle cover aperture for slidably receiving the handle cover.

Preferably, the handle cover includes a slide plate fixedly coupled to the handle cover. Also preferably, the cover plate includes a front surface that extends outwardly from the electrical switch, the front surface includes at least one mounting aperture, and the front surface is free of apertures other than the handle cover aperture and the at least one mounting aperture. In the presently preferred embodiments, the front surface of the cover plate in areas other than the handle cover aperture and the at least one mounting aperture is continuous and has uniform topography, and the cover plate is a single, solid component except for the handle cover aperture and the at least one mounting aperture.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 9 shows a perspective view of the switch handle cover plate for the switch cover shown in FIG. 1;

FIG. 10 shows a front view of the switch handle cover of FIG. 9;

FIG. 11 shows a back perspective view of the switch handle cover of FIG. 9;

FIG. 12 shows a back view of the switch handle cover shown in FIG. 9;

FIG. 13 shows a side view of the switch handle cover shown in FIG. 9;

FIG. 14 shows an end view of the switch handle cover plate shown in FIG. 9;

FIG. 19 shows a side view of the cover plate of FIG. 15;

FIG. 20 shows a side cutaway view of the cover plate of FIG. 15, taken along line 20—20 of FIG. 16;

FIG. 21 shows an end view of the cover plate of FIG. 15;

FIG. 22 shows a cutaway view of the cover plate of FIG. 15, taken along line 22—22 of FIG. 18;

FIG. 29 shows a side view of the handle cover assembly shown in FIG. 25, wherein the switch handle cover is in a first or "on" position;

FIG. 30 shows a side view of the handle cover assembly shown in FIG. 25 as shown in FIG. 29, but wherein the switch handle cover is in a second or "off" position;

FIG. 31 shows a side cutaway view of the switch handle cover assembly of FIG. 25, taken along line 31—31 shown in FIG. 26;

FIG. 32 shows an end view of the handle cover assembly shown in FIG. 25;

FIG. 33 shows an end cutaway view of the switch handle cover assembly of FIG. 25, taken along line 33—33 as shown in FIG. 28;

FIG. 34 shows a front perspective view of the cover plate of the switch cover shown in FIG. 23;

FIG. 35 shows a front view of the cover plate shown in FIG. 34;

FIG. 36 shows a back or rear perspective view of the cover plate shown in FIG. 34;

FIG. 37 shows a back or rear view of the cover plate shown in FIG. 34;

FIG. 38 shows a side view of the cover plate shown in FIG. 34;

FIG. 39 shows a side cutaway view of the cover plate shown in FIG. 34, taken along line 39—39 as shown in FIG. 35;

FIG. 40 shows an end view of the cover plate shown in FIG. 34;

FIG. 41 shows an end cutaway view of the cover plate shown in FIG. 34, taken along line 41—41 as shown in FIG. 37;

FIG. 54 shows a rear view of the cover handle of FIG. 51;

FIG. 55 shows a side view of the cover handle of FIG. 51;

FIG. 56 shows an end view of the cover handle of FIG. 51;

FIG. 60 shows a rear view of the cover plate of FIG. 57;

FIG. 61 shows a side view of the cover plate of FIG. 57;

FIG. 62 shows a cutaway side view of the cover plate of FIG. 57, taken along 62—62 of FIG. 60;

FIG. 63 shows an end view of the cover plate of FIG. 57;

FIG. 64 shows an end cutaway view of the cover plate of FIG. 57, taken along lines 64—64 of FIG. 60;

DETAILED DESCRIPTION OF THE PREFERRED EMBODIMENTS

Figure 1:
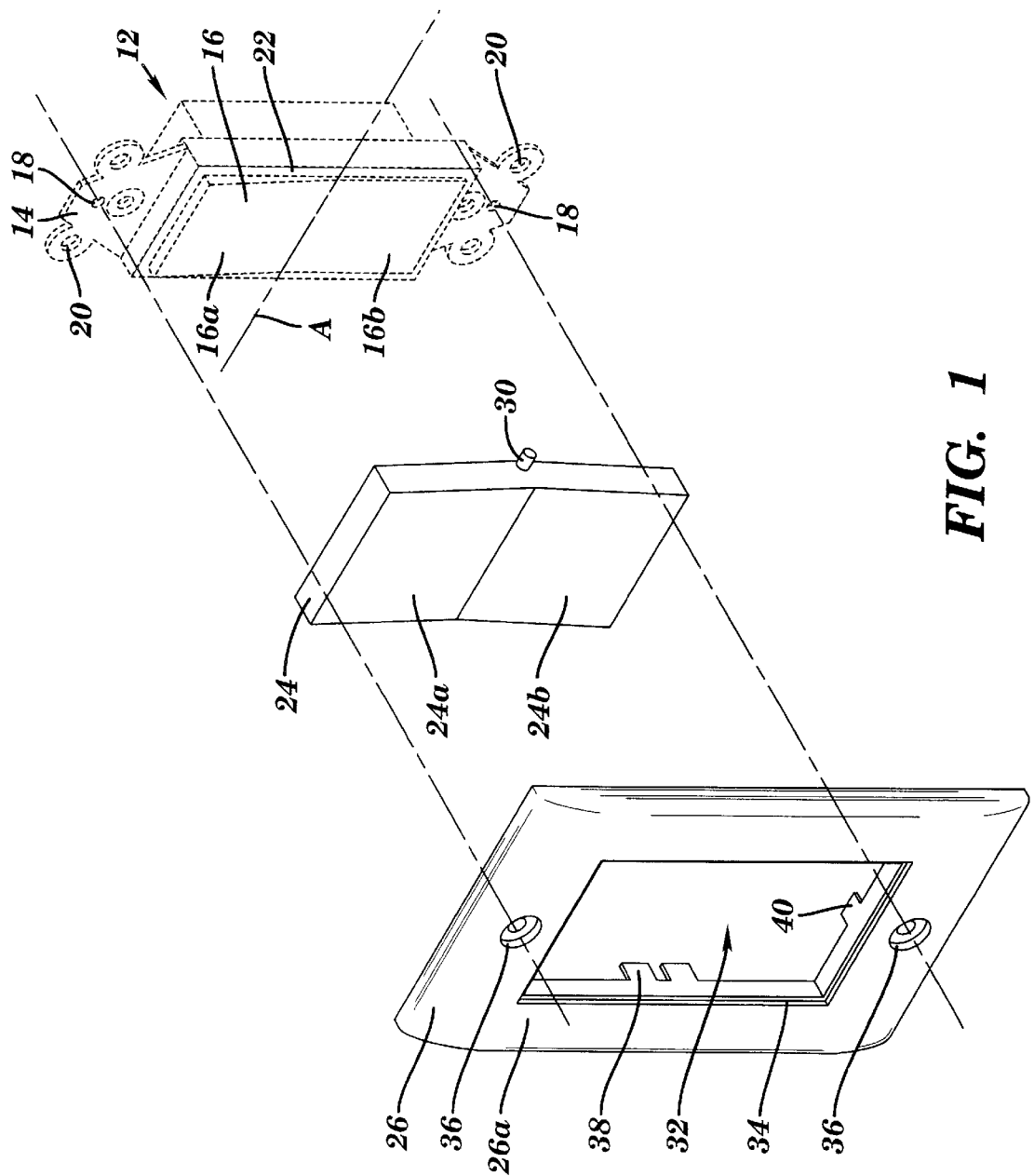
FIG. 1 is an expanded or exploded perspective view of an electrical switch cover according to a first preferred embodiment of the invention, which involves a rocker switch type design.
Figure 4:
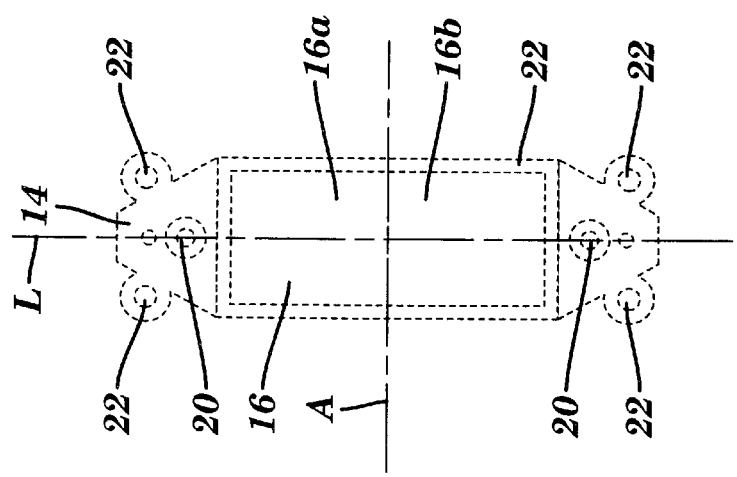
FIG. 4 shows a front view of the yoke of FIG. 3.
Figure 3:
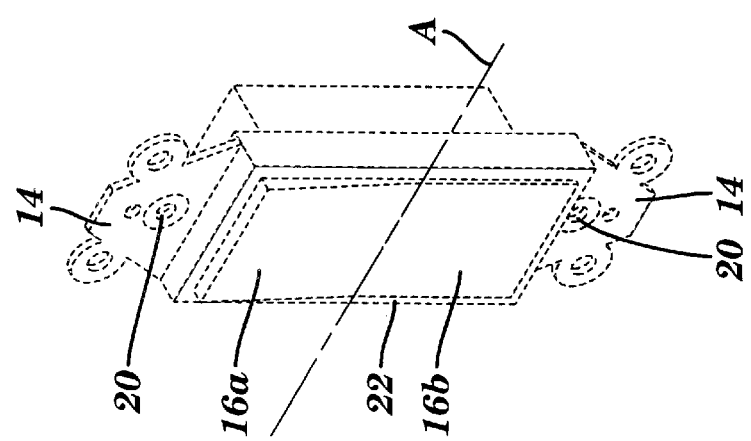
FIG. 3 shows a perspective view of the yoke to which the electrical switch cover of FIG. 1 is applied.

Reference will now be made in detail to the presently preferred embodiments of the invention as illustrated in the accompanying drawings, in which like reference characters designate like or corresponding parts throughout the drawings. It should be noted, however, that the invention in its broader aspects is not limited to the specific details, representative devices, and illustrative examples shown and described in this section in connection with the preferred embodiments.

In accordance with the invention, a cover is provided for an electrical switch. The electrical switch includes a yoke and a switch handle. For purposes of this aspect of the invention, the preferred form of electrical switch is the so-called rocker switch design. In accordance with this aspect of the invention, the electrical switch includes a handle cover sized and shaped to substantially conform to and fit over the switch handle of the electrical switch. The handle cover has rotation points disposed parallel to an axis. The switch also includes two planar surfaces, and each of the planar surfaces is parallel to and passes through the axis.

An electrical switch cover 10 according to a first preferred embodiment of the invention is shown in FIGS. 1, 2 and 7 through 22. FIG. 1 shows a front perspective view in expanded or exploded form.

Electrical switch cover 10 is adapted to be fitted to an electrical switch 12 which includes a yoke 14 and a switch handle 16 of the rocker type. An example of a rocker-style electrical switch for which this embodiment of the invention is well suited to cover is shown in FIG. 1, and separately in FIGS. 3–6. Rocker switch 12 as shown in these drawing figures and as further described below is representative of the types of rocker switches which the cover according to the first preferred embodiment is adapted to cover, but is merely illustrative of such rocker switch designs. The details of its design are not necessarily intended to be limiting as they relate to the invention.

Switch 12 with yoke 14 and switch handle 16 are shown are shown separately in FIGS. 3–6. Yoke 14 includes a pair of mounting screw holes 18 at each of its longitudinal ends for mounting switch 12 to a wall box (not shown), and a single mounting screw hole 20 at each such end for mounting a cover plate to the switch.

Switch handle 16 includes two flat planar surfaces 16a and 16b which join at a center or axial line A. The planes are about 1 1/16 inches wide (along axis A). Each plane is about 1 3/16 inches long along a longitudinal axis L, so that switch handle 16 of switch 12 is about 1 1/16 inches wide by about 2 3/8 inches long. Switch handle 16 is movably housed in a rectangular housing 22 which generally comprises part of the backing plate or yoke 14. Switch handle 16 is biased so that it can alternately assume one of two positions. In the first position, illustrated in FIG. 5, switch handle 16 is depressed at the bottom (plane 16b) and extends outwardly at the top (plane 16a). This corresponds to the "on" position for switch 12. In the second position, illustrated in FIG. 6, switch handle 16 is depressed at the top (plane 16a) and extends outwardly at the bottom (plane 16b). This corresponds to the "off" position for the switch 12.

Typically such rocker switch would be covered by a cover plate (not shown), but such cover plate would be removed prior to covering the remainder of the switch with the cover assembly of this embodiment.

Figure 8:
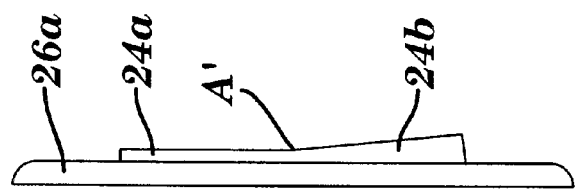
FIG. 8 shows a side view of the cover of FIG. 1 as shown in FIG. 7, but wherein the switch handle cover is in the second or "off" position.
Figure 7:
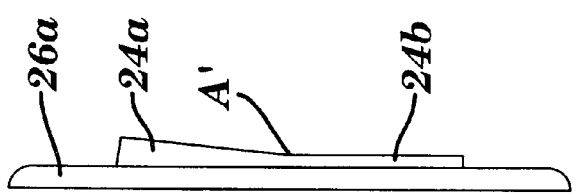
FIG. 7 shows a side view of the cover of FIG. 1, wherein the switch handle cover is in the first or "on" position.
Figure 6:
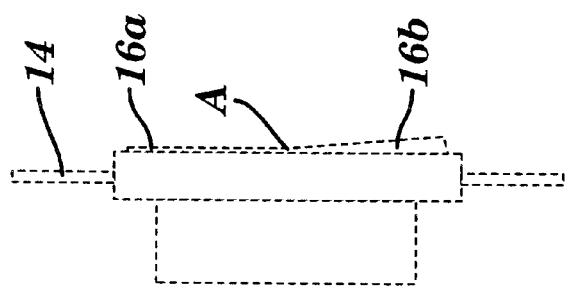
FIG. 6 shows a side view of the yoke of FIG. 3 as shown in FIG. 5, but wherein the switch handle is in a second or "off" position.
Figure 5:
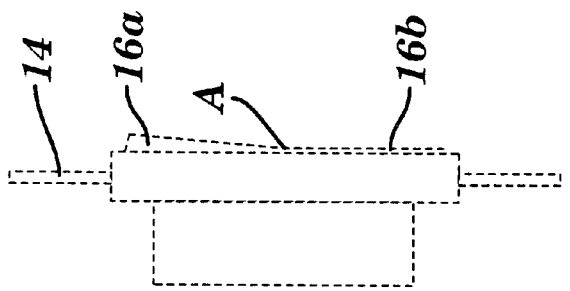
FIG. 5 shows a side view of the yoke of FIG. 3, wherein the switch handle is in a first or "on" position.
Figure 15:
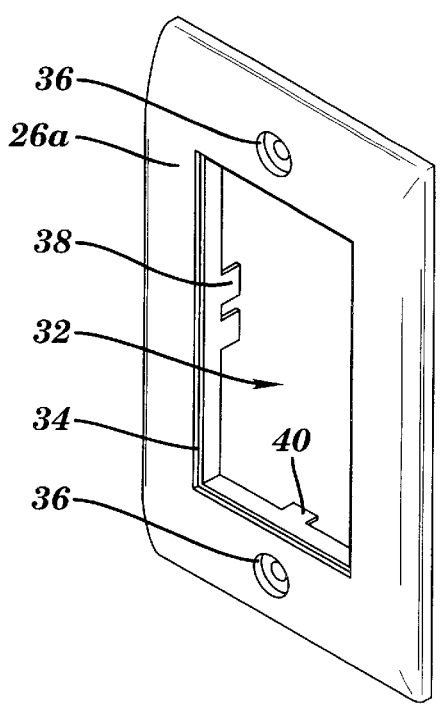
FIG. 15 shows a perspective view of the cover plate of the switch cover shown in FIG. 1.
Figure 16:
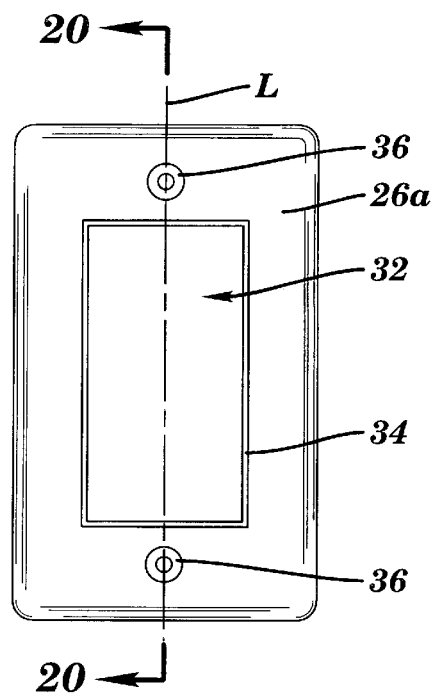
FIG. 16 shows a front view of the cover plate shown in FIG. 15.
Figure 17:
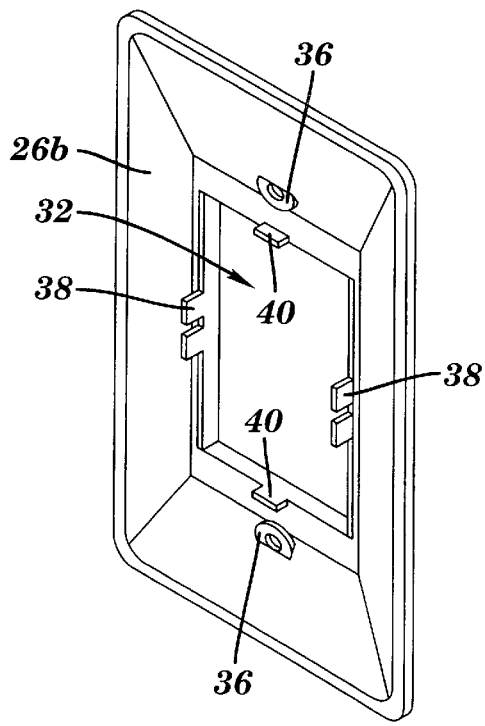
FIG. 17 shows a back or rear perspective view of the cover plate of FIG. 15.
Figure 18:
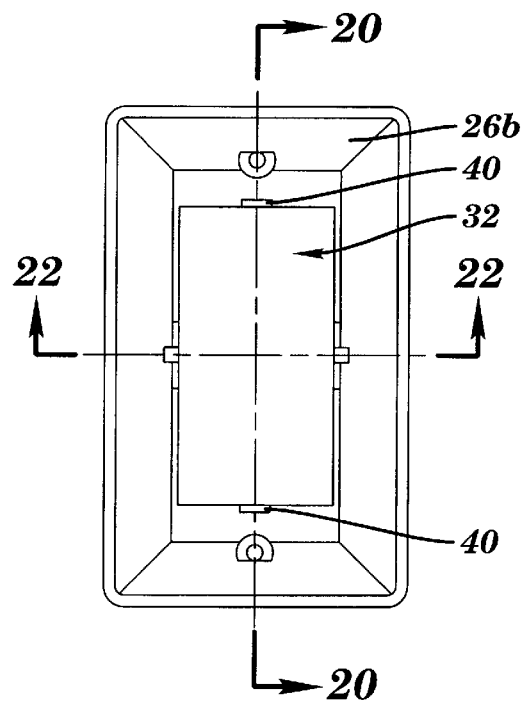
FIG. 18 shows a back view of the cover plate of FIG. 15.

With reference to FIG. 1, cover 10 includes a switch handle cover 24 and a cover plate 26. FIG. 7 shows a side view of cover 10 with handle cover 24 in a first or "on" position corresponding to the first or "on" position of switch 12 (FIG. 5). Similarly, FIG. 8 shows cover 10 with handle cover 24 in a second or "off" position different from the first position, in this instance, corresponding to the second of "off" position of switch 12 (FIG. 6). Cover 10, i.e., the assembly of handle cover 24 and cover plate 26, is substantially the same size as or slightly larger than cover plates generally available in the commercial market place. Cover 10 according to this embodiment measures about 4.75 inches long (along longitudinal axis L) by 3 inches wide (perpendicular to axis L along the plane of cover 10, corresponding to the drawing sheet in FIG. 2).

FIGS. 9 through 14 show various views of handle cover 24. FIG. 9 shows a front perspective view, FIG. 10 shows a front elevational view, FIG. 11 shows a rear perspective view, FIG. 12 shows a rear elevational view, FIG. 13 shows a side view (right or left), and FIG. 14 shows a top or bottom view.

The handle cover is adapted to cover the handle of the switch. The handle cover preferably conforms, at least generally, to the shape of the underlying switch cover, although variations are possible and even preferred in some instances. Handle cover 24 according to this embodiment has outside measurements of about 2⅞ inches in length by about 1½ inches in width by about 5/16 inches maximum depth.

Handle cover 24 on its outer surface includes two planar surfaces 24a and 24b corresponding respectively to planar surfaces 16a and 16b of switch handle 16. An axial line A' corresponding to axis A divides plane 24a from plane 24b. Each plane 24a and 24b measures about 1⅜ inches longitudinally by about 1 7/16 inches in width. Planes 24a and 24b are not coplanar, but instead are angled with respect to one another at about the same angle as is encountered for planes 16a and 16b of switch handle 16, which generally is between about 7 to 10 degrees. In the preferred embodiment, planes 24a and 24b are angled at about 8 degrees with respect to one another.

Handle cover 24 includes a cavity 28 on its back side for receiving and generally mating with switch handle 16. Cavity 28 has internal dimensions of about 2 11/16 inches by about 1 5/16 inches. Cavity 28 has a maximum depth (at the longitudinal ends) of about ¼ inches, and a minimum depth (at axis A') of about ⅛ inch.

Handle cover 24 is rotatably mounted to cover plate on the back side of cover plate by suitable rotation points. Rotation points as the term is used herein refers to means for securing the handle cover to the cover plate so that the handle cover can move or rotate in general relation with the movement of the underlying switch handle, which in this embodiment involves a rotating movement. In this embodiment, the rotation points comprise a pair of collinear axles 30, one on each side of handle cover 24 at their midpoints. The cooperation of these axles with cover plate 26 will be described below. This arrangement permits handle cover 24 to rotate or toggle from the first or "on" position to the second or "off" position and vice versa.

Figure 2:
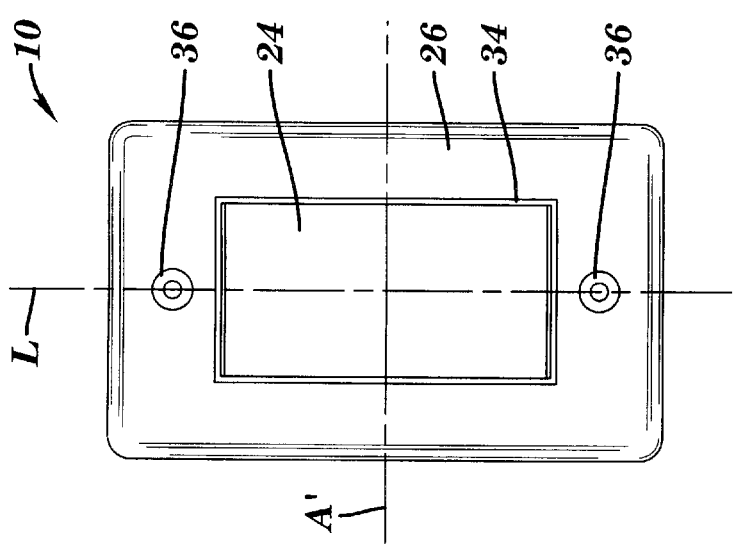
FIG. 2 shows a front view of the electrical switch cover of FIG. 1.

Cover plate 26, shown separately in FIGS. 15–22, includes a substantially-rectangular aperture 32 into which handle cover 24 fits. Aperture 32 is slightly larger than the length and width dimensions of handle cover 24. When handle cover 24 is attached to cover plate 26 as shown in FIGS. 2, 7 and 8, the non-elevated one of planes 24a and 24b is substantially even with the adjoining portion of outer surface 26a of cover plate 26 so that the non-elevated plane (24a or 24b) at aperture 32 forms a substantially smooth, uniform-textured surface including outer surface 26a of cover plate 26 and the non-elevated plane (24a or 24b). A small ridge 34 optionally may be provided at the peripheral edge of aperture 32, for example, to facilitate seating and guiding of the side portions of handle cover 24. Although there may be a visible seam between cover plate 26 and handle cover 24 at aperture 32, this seam is not pronounced. Cover plate 26 and the non-elevated plane (24a or 24b) of handle cover 24 according to this embodiment thus are mated to create a substantially smooth and substantially continuous surface, with the exception of the seam at aperture and ridge 34, if used.

Cover plate 26 may include mounting screw apertures 36, in addition to aperture 32. Mounting screw apertures 36 are positioned and sized to align and cooperate with yoke mounting screw apertures 20. In accordance with this preferred embodiment, however, other than mounting screw apertures 36 and the rectangular aperture 32 for handle cover 24, cover plate 26 is substantially continuous, and has uniform, preferably smooth or lightly-textured topography. A number of surface geometries are possible for cover plate 26. The back surface 26b of cover plate 26 preferably is rounded or curved, so it can easily cover and house the outer portion of the electrical switch to be covered (not shown). Front surface 26a preferably has a gently curved profile as well, although many other designs and geometries may be suitable, depending upon the application. In accordance with this preferred embodiment, outer surface 26a of cover plate 26 preferably has rounded or curved profiles at the peripheral edges, and is otherwise free of any surface discontinuities, such as indentations, projections, and the like.

Cover plate 26 includes contact points for receiving the rotation points in movable relation. Contact points as the term is used herein refers generally to means which operate in conjunction with the rotation points to permit the desired movement of the handle cover in cooperation with the switch handle. The rotation points and contacts points may comprise, for example, an axle and housing or bearing arrangement, a pin and seat arrangement, etc. In this preferred embodiment, the contact points comprise a pair of bearings 38 disposed on the longitudinal sides of aperture 32 approximately at their midpoints. Each bearing 38 includes a stanchion and a bearing surface, the latter of which receives the axle 30 in rotatable relation.

Preferably, the back surface of the cover plate includes at least one guide for contacting one of the longitudinal ends to guide the handle cover during movement. In this embodiment, a pair of stanchions 40 are provided approximately at the center of the width dimension within aperture 32, one at the top and one at the bottom, to serve as guides for the outer or longitudinal ends of handle cover 24.

Cover 10 may be installed on electrical switch 12 in the following manner. If there is a cover plate (not shown) originally on switch 12, it is removed in known manner. Handle cover 24 then is positioned into cover plate 26 so that axles 30 are positioned in bearings 38 and handle cover 24 fits into aperture 32 as shown in FIG. 1. Cover 10, with handle cover 24 matted with cover plate 26, then is attached to switch 12 by passing screws (not shown) through apertures 36 of cover plate 26 and into threaded apertures 18 in switch 12.

Cover 10 operates in conjunction with switch 12 in the following manner. Handle cover 24 loosely contains switch handle 16. Assuming switch handle 16 and handle cover 24 are in the first or "on" position, one merely depresses plane 16b of handle cover 24 as one would do with switch 16 if used by itself. This causes handle cover 24 and switch handle 16 to move to the second or "off" position.

Cover 10 is advantageous, for example, in that it serves to enlarge somewhat the effective size of the switch handle, and in that it covers the original switch and switch handle for cosmetic and other reasons while working in cooperation with the original switch and handle to preserve its operating characteristics and functionality. This can provide substantial time and costs savings when replacing switches throughout an entire house or building.

In accordance with another aspect of the invention, a cover is provided for an electrical switch which, as with electrical switch 12, includes a yoke and a switch handle, preferably a toggle-type switch handle. The cover according to this aspect of the invention comprises a handle cover assembly including a handle cover member sized and shaped to substantially conform to and fit over the switch handle, and a face member in which the handle cover member is slidably disposed. The handle cover member includes a handle cover which forms a cavity for receiving the switch handle. The cover further includes a cover plate having a handle cover aperture for receiving the handle cover assembly.

Figure 23:
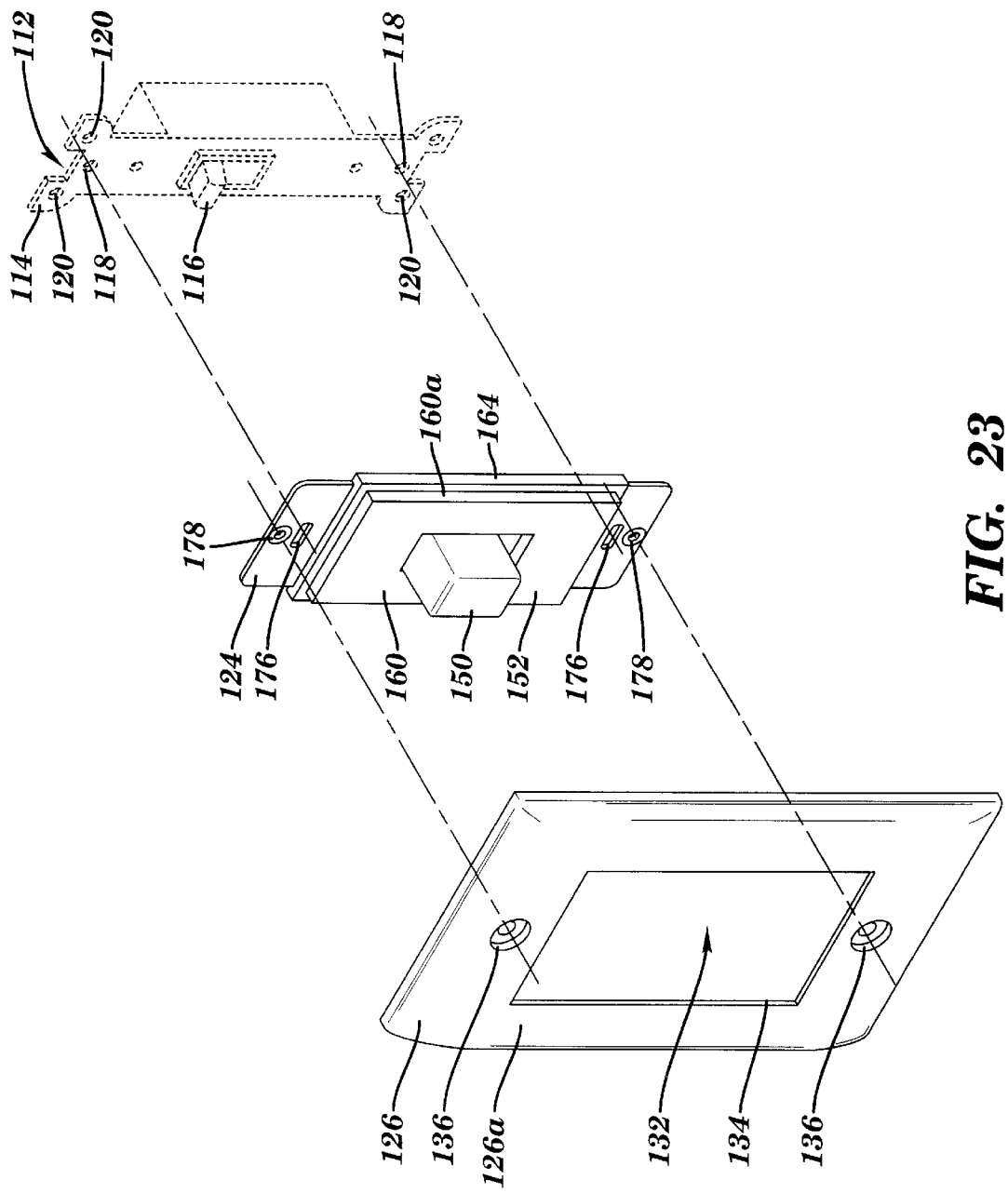
FIG. 23 shows an expanded or exploded perspective view of an electrical switch cover according to a second preferred embodiment of the invention, which involves an electrical switch cover for a toggle-type electrical switch.
Figure 26:
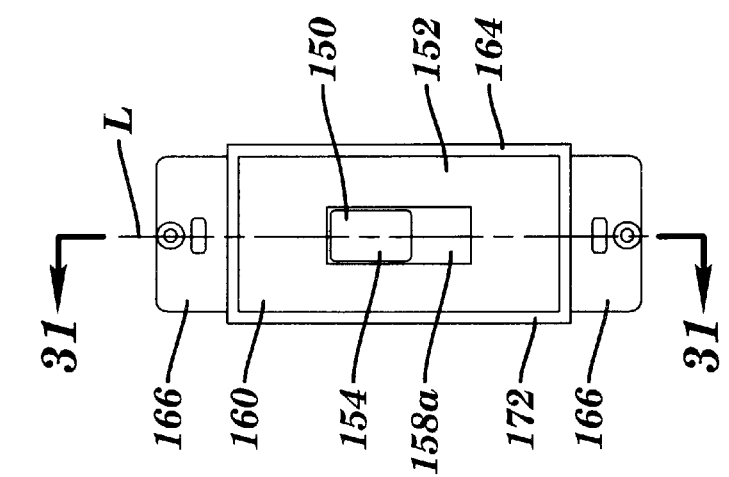
FIG. 26 shows a front view of the handle cover assembly of FIG. 25.
Figure 25:
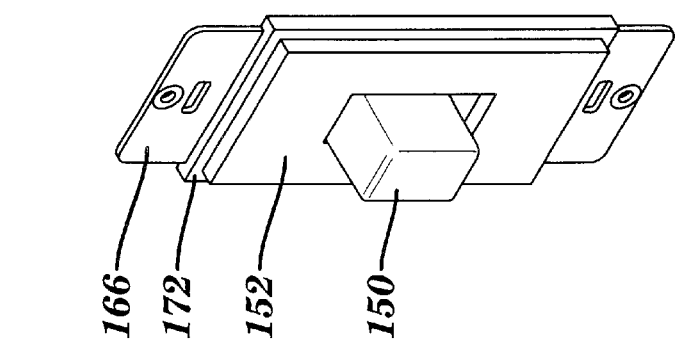
FIG. 25 shows a front perspective view of the handle cover assembly of the electrical switch cover shown in FIG. 23.
Figure 24:
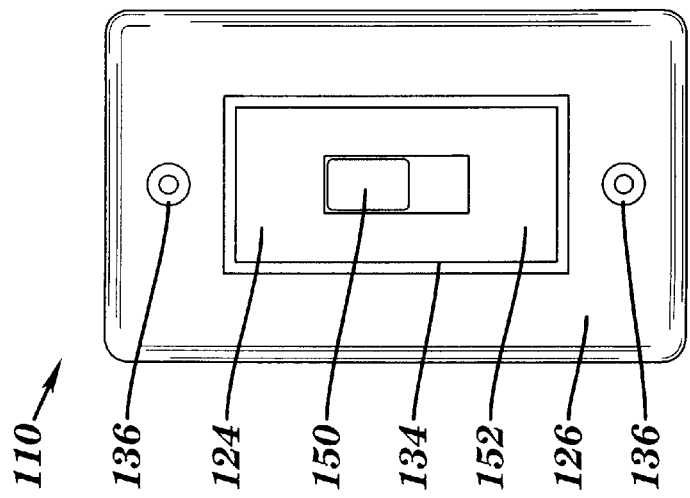
FIG. 24 shows a front view of the electrical switch cover of FIG. 23.
Figure 28:
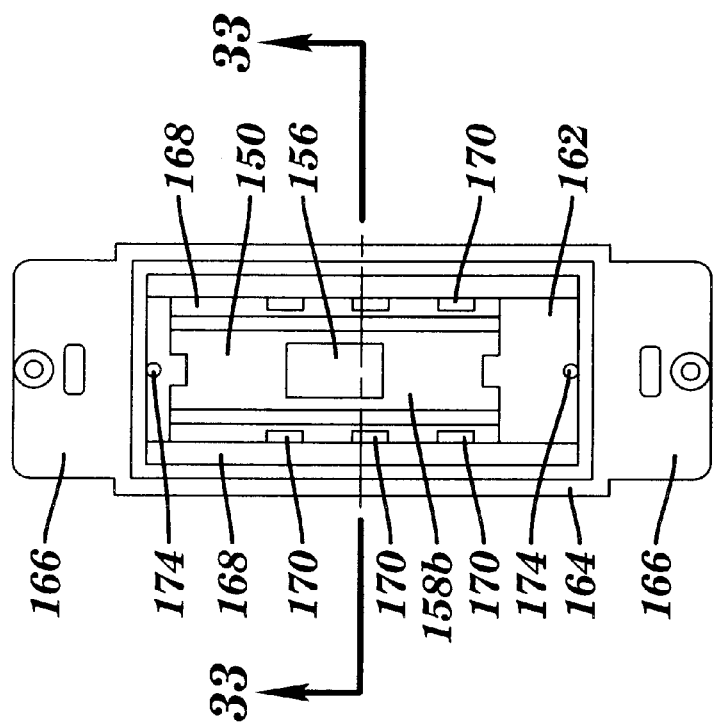
FIG. 28 shows a rear view of the handle cover assembly shown in FIG. 25.
Figure 27:
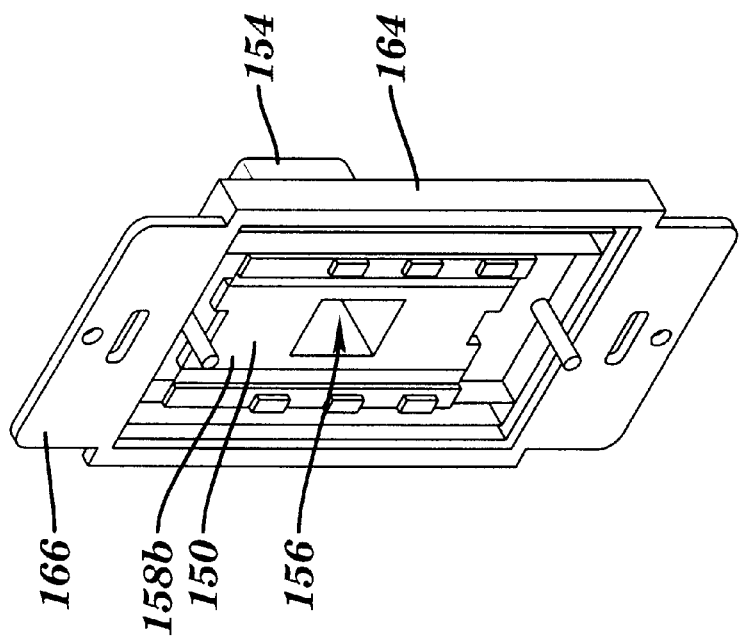
FIG. 27 shows a back or rear perspective view of the handle cover assembly shown in FIG. 25.

A cover 110 according to a preferred embodiment of this aspect of the invention is depicted in FIGS. 23–41. In this embodiment, the cover is ideally suited for use in covering a commercially-known toggle switch, such as switch 112 as shown in FIG. 23. Switch 112 includes a yoke 114 and a switch handle 116. Yoke mounting screw apertures 118 and 120 are provided in the same manner as apertures 18 and 20 in the first preferred embodiment described above.

In accordance with this embodiment, cover 110 includes a handle cover assembly 124 and a cover plate 126. Various views of the handle cover assembly and its components are shown in FIGS. 25–33. Handle cover assembly 124 includes a handle cover member 150 and a face member 152. Handle cover assembly 124 serves essentially the same functions as handle cover 24 of the first embodiment, for example, to cover the switch handle while generally conforming to it in shape and size and while accommodating the movement of the switch handle, although the specific manner in which this is done varies somewhat to accommodate the differences in design and operation of the toggle-type switch as opposed to the rocker-type switch. Accordingly, handle cover member 150 is sized and shaped to substantially conform to and fit over switch handle 116.

As noted, handle cover assembly 124 in this embodiment includes two components, i.e., a handle cover member 150 and a face member 152. Handle cover member 150 is slidably disposed within face member 152.

Handle cover member 150 includes a handle cover box 154 which forms a cavity 156 for receiving switch handle 116. Handle cover member 150 also includes a slide plate 158 which is integral with handle cover box. The outside of handle cover 154 measures about ⅝ inches long by ⅜ inches wide by ½ inches deep (to slide plate 158). Slide plate measures about 2 inches long by ⅞ inches wide. Both the front surface 158a and the back surface 158b of slide plate 158 are substantially flat.

Handle cover member 150 is disposed to movably mate with face member 152 and slide along the longitudinal dimension L from the first position (FIG. 29) to the second position (FIG. 30).

Face member 152 includes a substantially rectangular face plane 160, a substantially rectangular back plane 162, a peripheral flange 164, and a yoke extension 166. Face plane 160 comprises a substantially planar surface which substantially mates with front surface 126a of cover plate 126. Back plane 162 lies opposite face plane 160. Back plane includes a pair of guides 168 with securing flanges which are coupled to and extend outwardly from guides 168. Peripheral flange 164 extends around the outside of face plane 160, and includes a ridge 172 for mating with cover plate 126 as described in greater detail below. At least one post, in this embodiment two posts 174, are provided on and extending from back plane 162 for aligning cover 110 with electrical switch 112. Yoke extension 166 extends longitudinally from peripheral flange 164 and includes a first pair of mounting screw apertures 176 for receiving mounting screws for attaching handle cover assembly 150 to aperture 118 switch 112, and a second pair of mounting screw apertures 118 are provided for securing cover plate 126 to handle cover assembly 124 (see, e.g., FIG. 23).

Handle cover assembly overall measures approximately 4.125 inches longitudinally and about 1.5 inches in width. Face member 152, and more specifically elevated, substantially rectangular face plane 160, measures about 2⅝ inches long by 1¼ inches wide. Face plane 160 is elevated about ¼ inch above peripheral flange 164, which extends around face plane 160. Peripheral flange 164 extends outwardly in the length and width dimensions about ⅛ inch relative to the outer or peripheral edge 160a of face plane 160. Yoke extension 166 extends outwardly in the longitudinal dimension L from each end of peripheral flange about ¾ inches.

Slide plate 158 of handle cover member 150 measures about 2 inches long by ⅞ inches wide. Guides 168 are parallel to one another and are spaced from one another slightly further than the width of slide plate 158 so that slide plate 158 is secured by, but moves longitudinally within, guides 168 on back plane 162. Guides 168 thus slidably receive, retain and guide handle cover member 150, and more particularly the peripheral longitudinal edges 158a and 158b of slide plate 158.

Cover plate 126 includes a front surface 126a which extends outwardly from electrical switch 112. Front surface 126a includes a substantially rectangular aperture 132 with a ridge 134 at its periphery. At least one mounting aperture, in this case two mounting screw apertures 136, extend through cover plate 126. In this preferred embodiment, front surface 126a is free of apertures other than handle cover aperture 132 and the at least one mounting aperture, here apertures 136. In this embodiment, front surface 126a of cover plate 126 in areas other than handle cover member aperture 132 and the at least one mounting aperture is continuous and has uniform topography. Preferably, cover plate 126 is a single, solid component except for handle cover aperture 132 and the at least one mounting aperture, here apertures 136.

In this embodiment, handle cover aperture 132 is slightly larger than the length and width dimensions of face plane 160, and it is slightly less in depth dimension relative to the depth dimension of peripheral flange 164, so that face plane 160 fits into and mates with aperture 132 to form a snug fit, and to form a substantially smooth, uniform-textured surface including the outer or front surface 126a of cover plate 126 and face plane 160. Although there is a visible seam between cover plate 126 and face plane 160 at aperture 132, this seam is not pronounced. Cover plate 126 and face plane 160 in this preferred embodiment thus are mated to create a substantially smooth and substantially continuous surface, with the exception of seam at aperture 132.

A number of surface geometries are possible for cover plate 126 and face plane 160. The back surface 126b of cover plate preferably is rounded or curved, so it can easily cover and house the outer portion of electrical switch 112. The outer or front surface 126a of cover plate 126 may assume a number of different geometries. In accordance with this preferred embodiment, outer surface 126a preferably has rounded or curved profiles at the peripheral edges, and is otherwise free of any surface discontinuities, such as indentations, projections, and the like.

Cover 110 may be installed on electrical switch 112 in the following manner. Any cover plate (not shown) originally on switch 112 is removed in known manner. Handle cover assembly 124 then is attached to electrical switch 112 as shown in FIG. 23 by passing screws through apertures 176 of handle cover assembly 124 and into apertures 118 of switch 112. Cover plate 126 then is attached to handle cover assembly 124 by passing screws through apertures 136 of cover plate 126 and into threaded apertures 118 in handle cover assembly.

Cover 110 operates in conjunction with switch 110 in the following manner. Handle cover box 154 loosely contains switch handle 116. Assuming switch handle 116 and handle cover box 154 are in the first or "on" position, one merely moves handle cover box 154 downwardly as one would do with switch 116 if used by itself. This causes handle cover box 154 and switch handle 116 to move downwardly to the second or "off" position by moving slide plate 158 downward longitudinally along guides 168. Movement of slide plate 158 is stopped at the second or "off" position by the abutment of the longitudinal end of slide plate 158 against the interior portion of peripheral flange 164 at the longitudinal end of back plane 162.

In accordance with another aspect of the invention, a cover is provided for an electrical switch. The electrical switch includes a yoke and a switch handle, as described above. In the preferred implementation, the switch handle comprises a toggle-type device.

In accordance with this aspect of the invention, the cover comprises a handle cover sized and shaped to substantially conform to and fit over the switch handle. The handle cover includes a handle cover cavity for receiving the switch handle.

Figure 42:
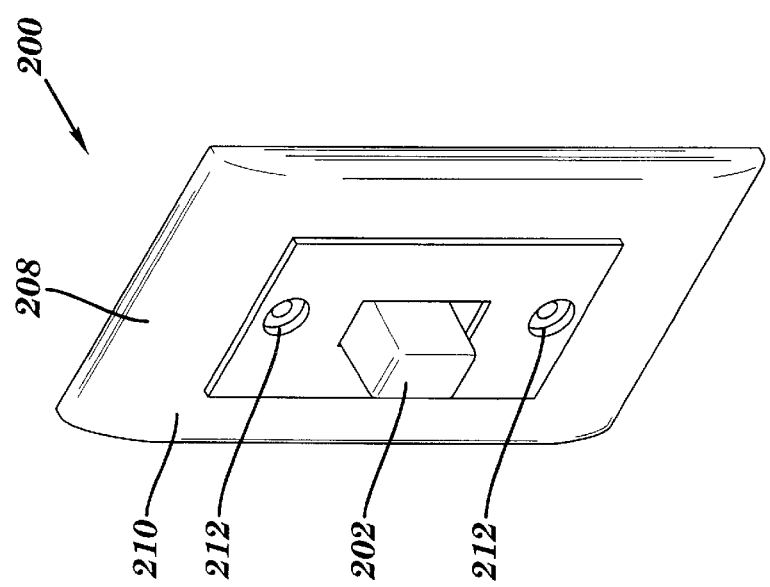
FIG. 42 shows a front perspective view of an electrical switch cover according to a third preferred embodiment of the invention, which involves a cover for a toggle-type electrical switch.
Figure 46:
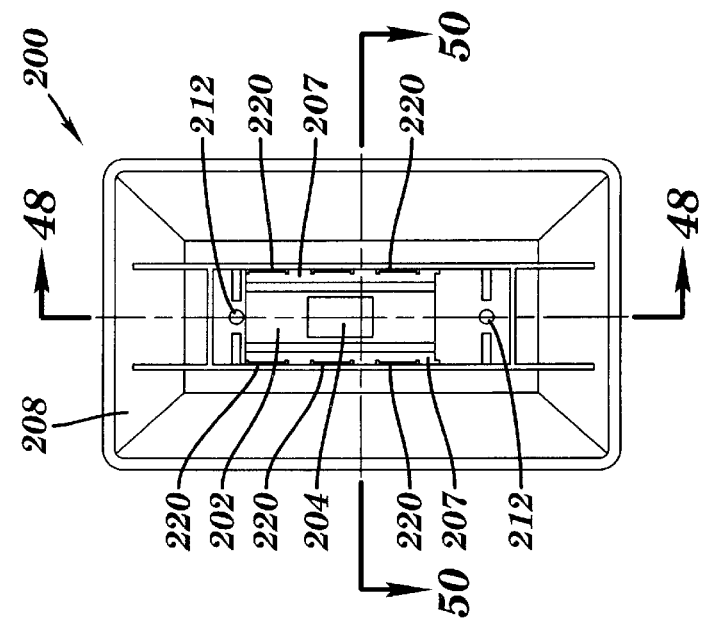
FIG. 46 shows a back view of the cover shown in FIG. 42.
Figure 45:
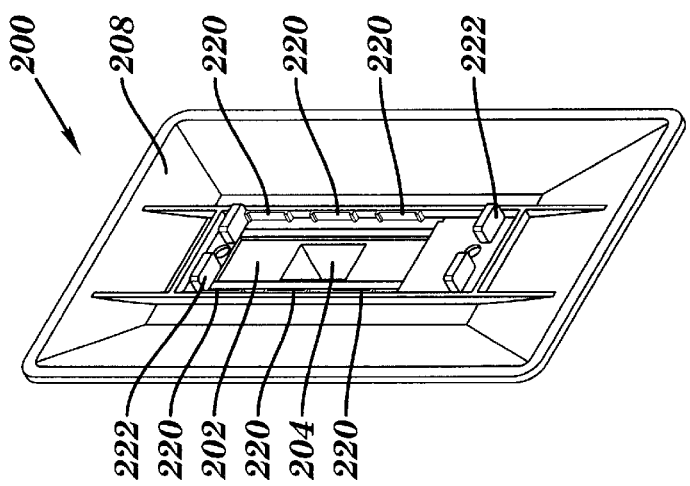
FIG. 45 shows a back perspective view of the cover shown in FIG. 42.
Figure 44:
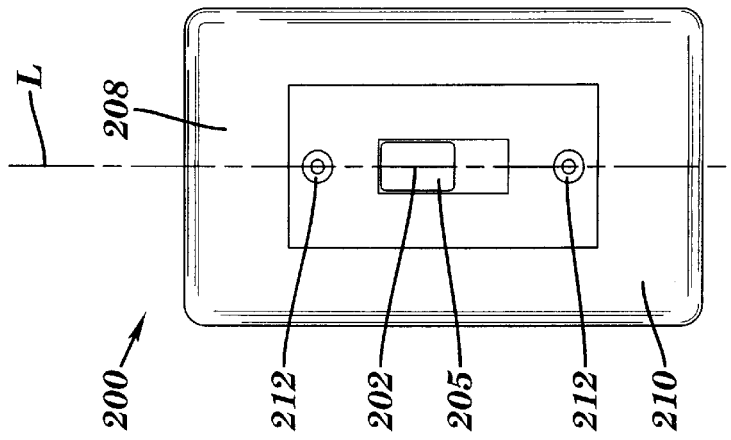
FIG. 44 shows a front view of the cover of FIG. 42.
Figure 47:
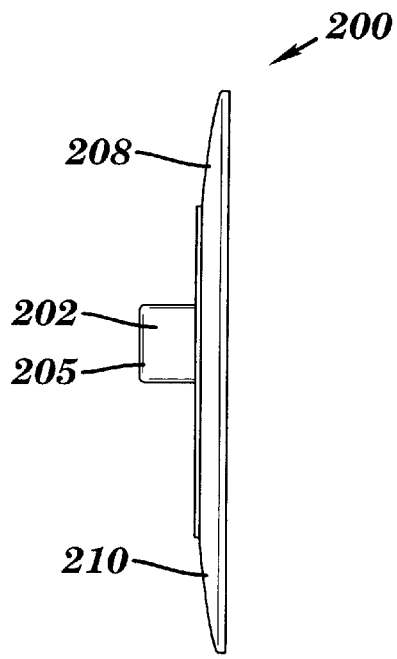
FIG. 47 shows a side view of the cover shown in FIG. 42.
Figure 48:
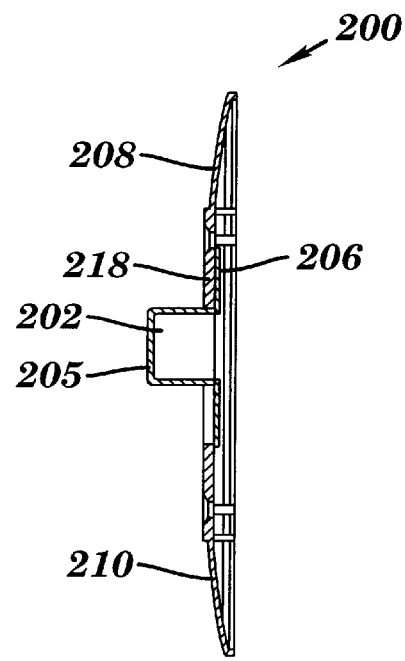
FIG. 48 shows a side cutaway view of the cover of FIG. 42, taken along line 48—48 in FIG. 46.
Figure 49:
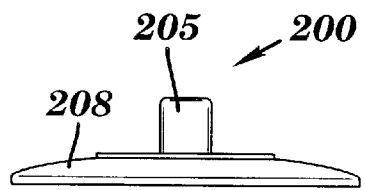
FIG. 49 shows an end view of the cover of FIG. 42.
Figure 50:
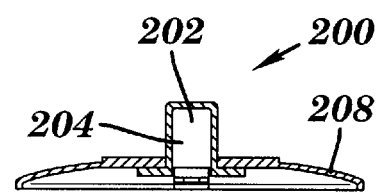
FIG. 50 shows an end cutaway view of the cover of FIG. 42, taken along line 50—50 in FIG. 46.
Figure 53:
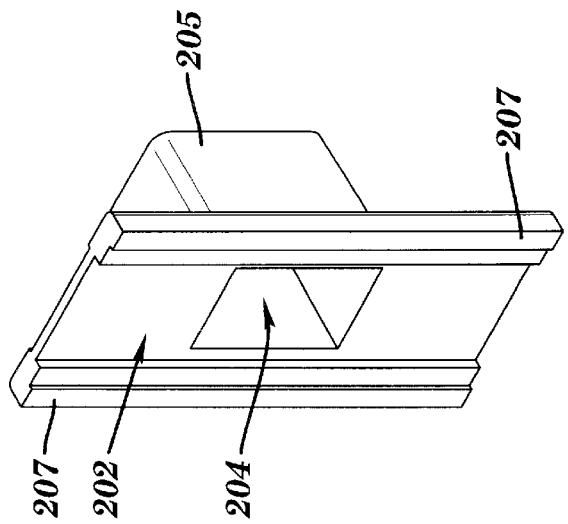
FIG. 53 shows a rear perspective view of the cover handle of FIG. 51.
Figure 52:
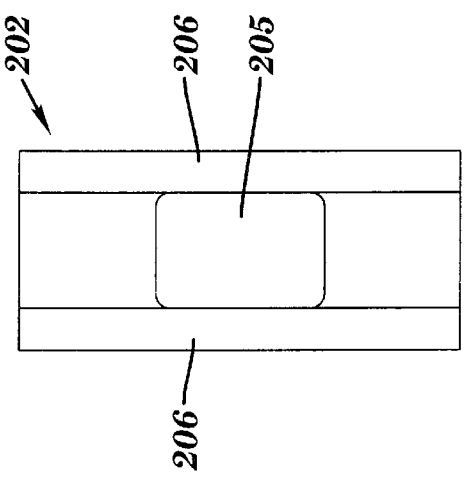
FIG. 52 shows a front view of the handle cover of FIG. 51.
Figure 51:
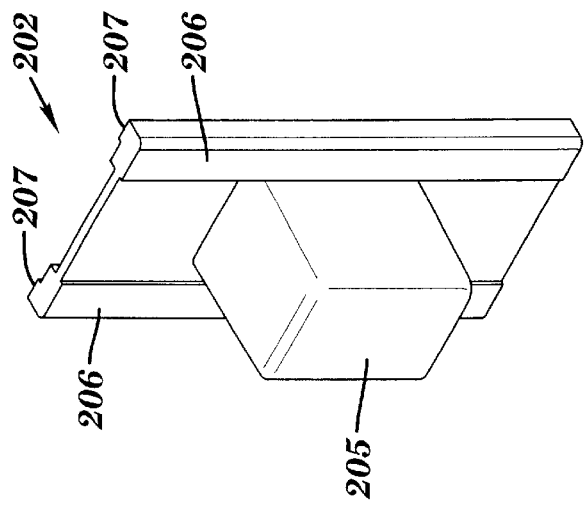
FIG. 51 shows a front perspective view of the handle cover for the cover of FIG. 42.
Figure 59:
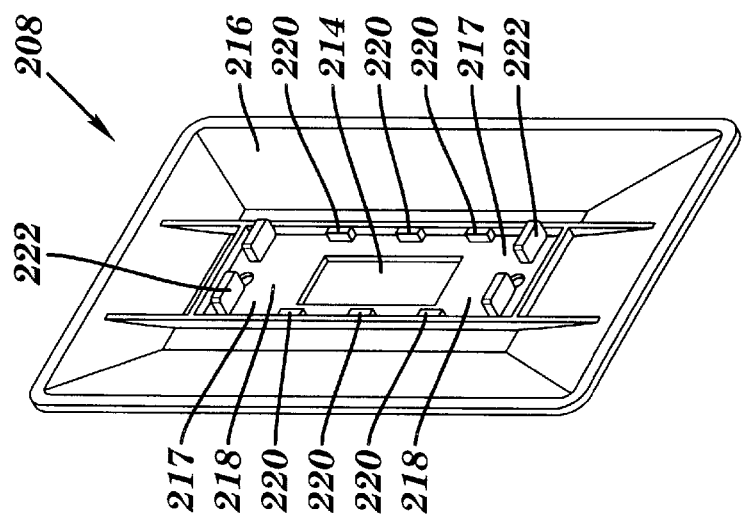
FIG. 59 shows a rear perspective view of the cover plate of FIG. 57.
Figure 58:
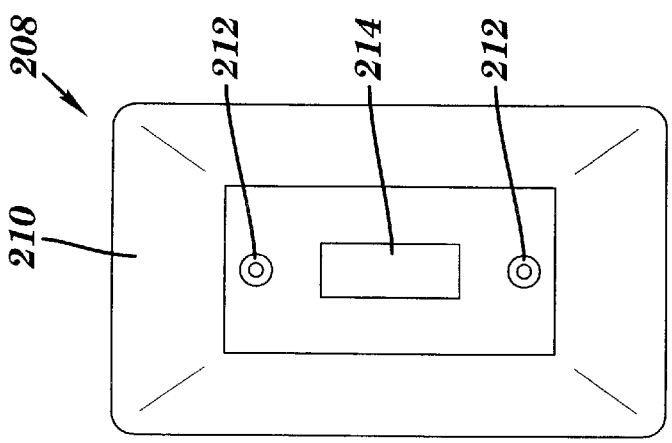
FIG. 58 shows a front view of the cover plate of FIG. 57.
Figure 57:
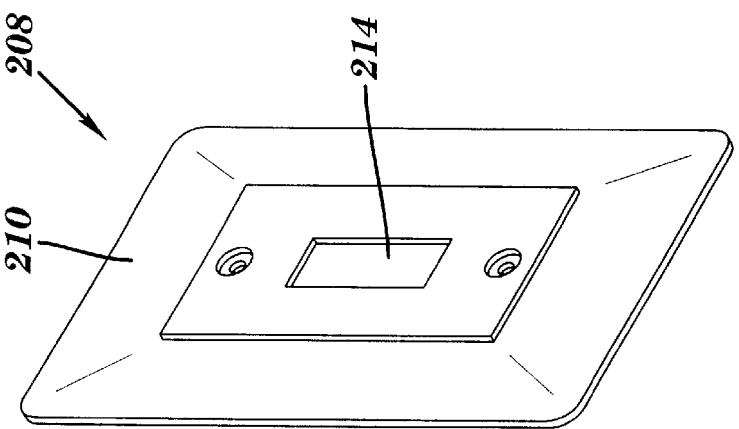
FIG. 57 shows a front perspective view of the cover plate for the cover of FIG. 42.
Figure 67:
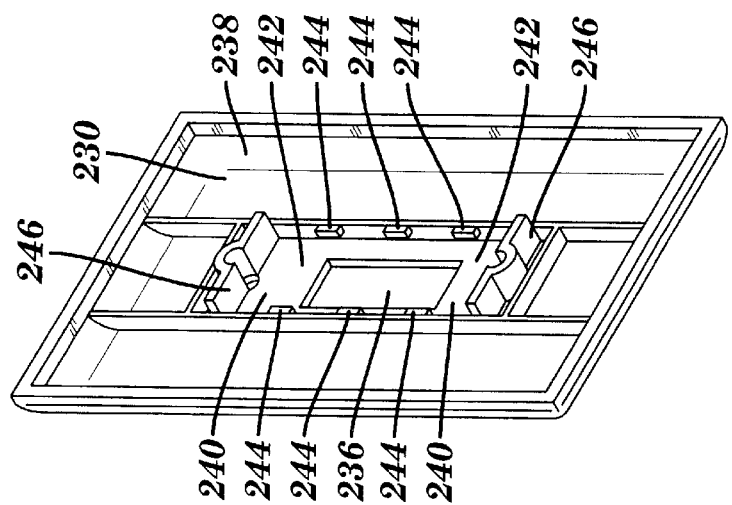
FIG. 67 shows a rear perspective view of the cover of FIG. 65.
Figure 66:
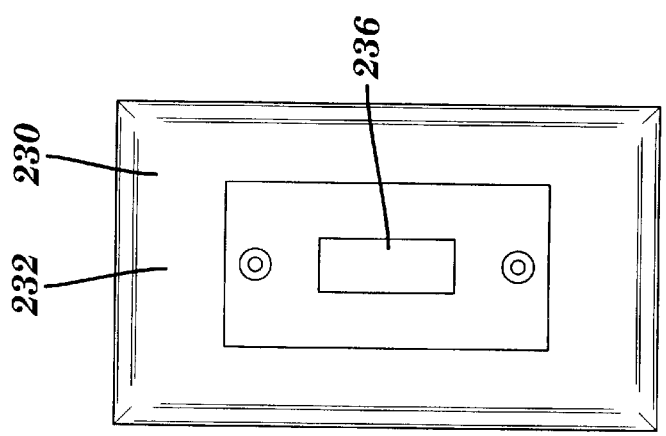
FIG. 66 shows a front view of the cover plate of FIG. 65.
Figure 65:
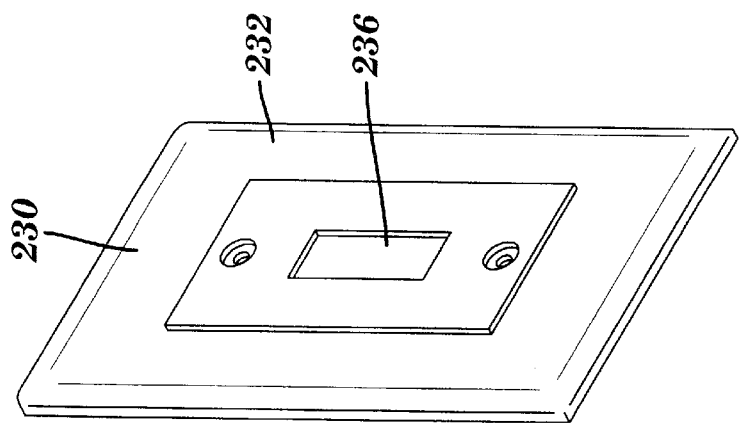
FIG. 65 shows a front perspective view of a cover plate in accordance with a fourth preferred embodiment of the invention.
Figure 70:
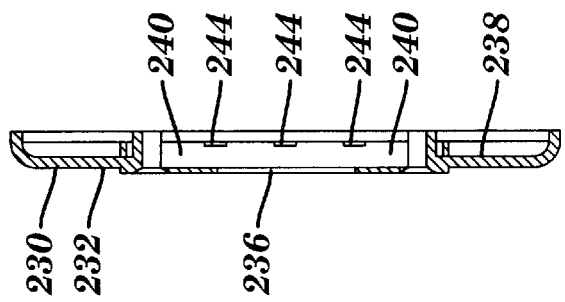
FIG. 70 shows a side cutaway view of the cover plate of FIG. 65, taken along lines 70—70 of FIG. 68.
Figure 72:
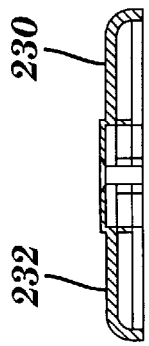
FIG. 72 shows an end cutaway view of the cover plate of FIG. 65, taken along lines 72—72 of FIG. 68.
Figure 69:
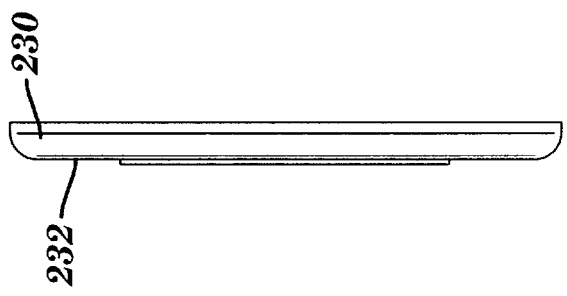
FIG. 69 shows a side view of the cover plate shown in FIG. 65.
Figure 71:
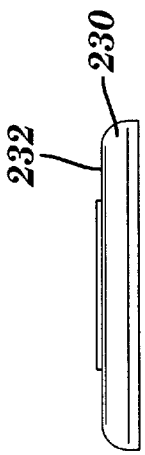
FIG. 71 shows an end view of the cover plate of FIG. 65.
Figure 68:
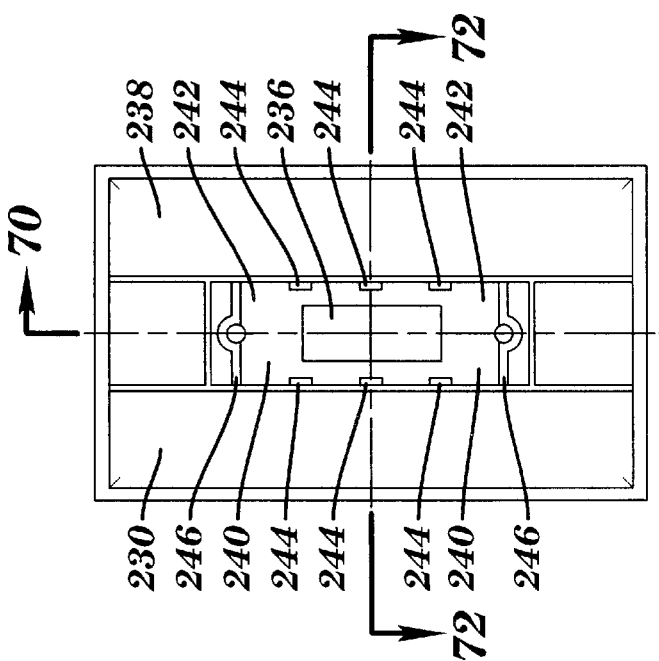
FIG. 68 shows a rear view of the cover plate of FIG. 65.

A cover 200 according to a presently preferred embodiment of this aspect of the invention is shown in FIG. 42. Cover 200 is shown and expanded or exploded view in FIG. 43. Cover 200 is adapted to cover a toggle-type switch, such as switch 112 having a switch handle 116. Cover 200 includes a handle cover 202 sized and shaped to substantially conform to and fit over switch handle 116. Handle cover 202 includes a handle cover cavity 204 into which switch handle 116 can be inserted. Handle cover cavity 204 is formed by a handle cover box 205. Handle cover 202 on its outer surface includes a slide surface 206 comprising two attached or integrally formed, substantially parallel rails 206, and on its outer or back surface includes a slide surface 207 also comprising a pair of substantially parallel rails 207.

Further in accordance with this aspect of the invention, the cover includes a cover plate having a handle cover aperture for slidably receiving the handle cover. As implemented in the preferred embodiment, cover 200 includes a cover plate 208. Cover plate 208 includes a front surface 210 that extends outwardly from electrical switch 112. Front surface 210 includes at least one mounting aperture 212 (here there are two such apertures) for mounting cover plate 208 to electrical switch 112, and a handle cover aperture 214. Front surface 210 is free of apertures other than handle cover aperture 214 and mounting apertures 212. In this illustrative but preferred embodiment, front surface 210 of cover plate 208 in areas other than handle cover aperture 214 and mounting apertures 212 is continuous and has uniform topography. Moreover, cover plate 208 is a single, solid component except for handle cover aperture 214 and mounting apertures 212.

Cover plate 208 includes a back surface 216 opposite front surface 210. Back surface 216 includes a handle cover housing channel 217, which in turn includes a slide surface 218. A series of tabs 220 are provided at the periphery of channel 217 and slide surface 218. When handle cover 202 is mated with cover plate 208, as generally shown in FIGS. 42 through 50, handle cover 202 resides in handle cover housing channel 217 so that handle cover box 205 extends through handle cover aperture 214 and is movable or slidable within it along longitudinal axis L. Slide surface 206 of handle cover 202 contacts slide surface 218 of cover plate 208 in sliding relation along longitudinal axis L. Cover plate tabs 220 loosely contact back peripheral edge 207 of handle cover 202 to permit handle cover 202 to slide longitudinally but while retaining handle cover 202 in mating relation with cover plate 208 and in channel 217 between stops 222.

Figure 43:
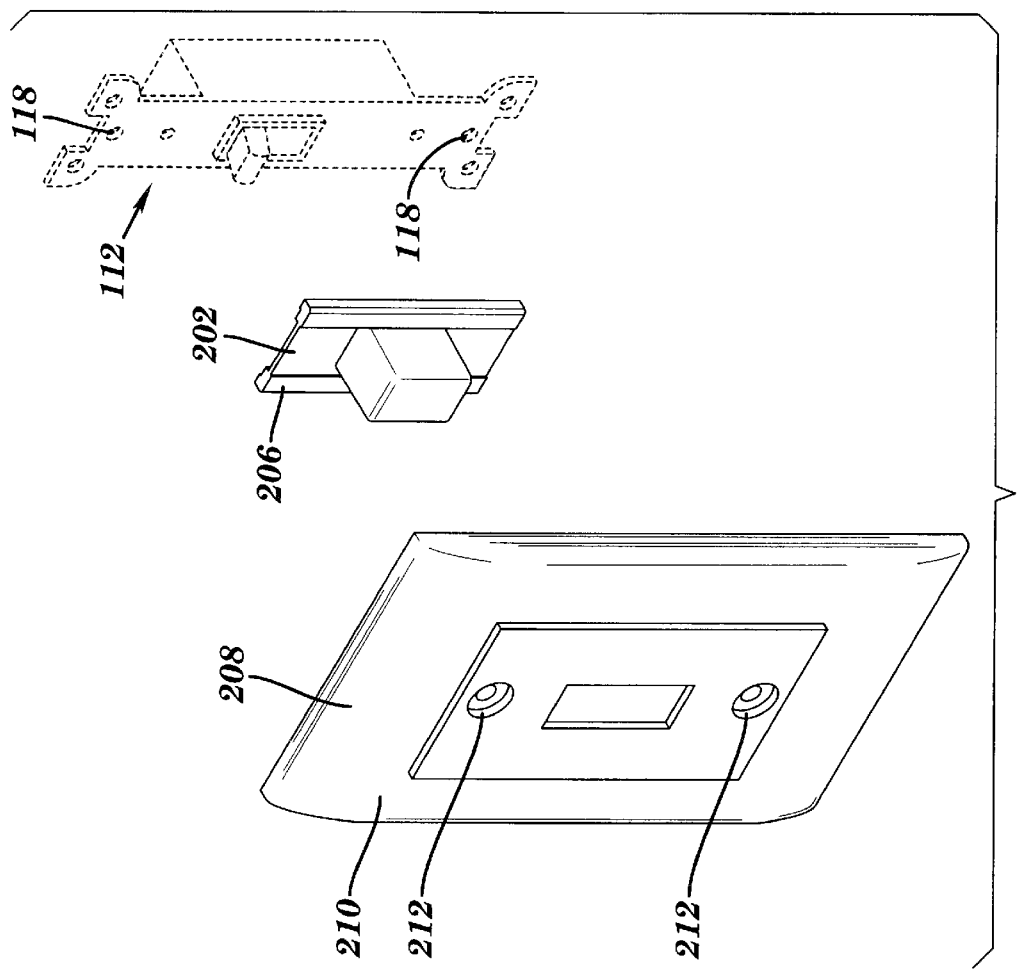
FIG. 43 is an expanded or exploded front perspective view of the cover of FIG. 42.

Cover 200 may be installed on electrical switch 112 essentially in the same manner as that described above for cover 110. In operation, cover 200 would be attached to electrical switch 112 as generally shown in FIG. 43 in exploded view, and as in FIGS. 42 and 44 through 50 in fully assembled form. As one moves handle cover box 205 between its upward and downward longitudinal positions, switch handle 116 of electrical switch 112 is correspondingly moved or toggled between its upward and downward longitudinal positions to activate and deactivate the switch.

The illustrative design of cover 200 provides the same advantages as cover 110, as noted above. Cover 200 affords an additional potential advantage in that it comprises fewer parts than cover 110, and therefore may be manufactured and used more cost effectively.

The design of cover plate 208 is not necessarily limiting, and other cover plate designs are possible. For example, a cover plate 230 includes a front surface 232, mounting apertures 234, and a handle cover aperture 236. Other than handle cover aperture 236 and mounting apertures 234, front surface 232 of cover plate 230 is continuous and has uniform topography. Cover plate 230 comprises a single, solid component except for these apertures. Cover plate 230 is adapted to be used with handle cover 202, as shown in FIGS. 51 through 56. Accordingly, handle cover aperture 236 is sized and configured to receive handle cover box 205. Cover plate 230 has a back surface 238 that includes a handle cover housing channel 240, a slide surface 242, tabs 244, and end stops 246, as described above with respect to channel 217, sliding surface 218, tabs 220 and end stops 222, respectively. The manner of installation and operation of cover plate 230 is essentially identical to cover 200.

Additional advantages and modifications will readily occur to those skilled in the art. For example, the absolute and/or relative dimensions of the embodiments provided above may be different from those disclosed herein, depending upon the intended application. Therefore, the invention in its broader aspects is not limited to the specific details, representative devices and methods, and illustrative examples shown and described. Accordingly, departures may be made from such details without departing from the spirit or scope of the general inventive concept as described herein.

What is claimed is:

1. A cover for an electrical switch, the electrical switch including a yoke and a switch handle, the cover comprising:

a handle cover sized and shaped to fit over the switch handle and thereby substantially conform thereto, the handle cover including a handle cover cavity for receiving the switch handle and rails on opposing sides of the handle cover; and a cover plate having a handle cover aperture for slidably receiving the handle cover;

wherein, when assembled, the rails of the handle cover are slidably disposed between and in contact with both the cover plate and the electrical switch.

2. A cover as recited in claim 1, wherein the handle cover includes a slide surface fixedly coupled to the handle cover.

3. A cover as recited in claim 1, wherein:

the cover plate includes a front surface which extends outwardly from the electrical switch;

the front surface includes at least one mounting aperture; and the front surface is free of apertures other than the handle cover aperture and the at least one mounting aperture.

4. A cover as recited in claim 3, wherein:

the front surface of the cover plate in areas other than the handle cover aperture and the at least one mounting aperture is continuous and has uniform topography; and the cover plate is a single, solid component except for the handle cover aperture and the at least one mounting aperture.

5. A cover for an electrical switch, the electrical switch including a yoke and a switch handle, the cover comprising:

a handle cover sized and shaped to fit over the switch handle, the handle cover including rails on opposing sides of the handle cover and a handle cover cavity for receiving the switch handle; and a cover plate having a handle cover aperture for slidably receiving the handle cover and at least two opposing tabs spaced from the handle cover aperture and slidably engaging the rails of the handle cover.

6. A cover as recited in claim 5, wherein:

the cover plate includes a front surface which extends outwardly from the electrical switch;

the front surface includes at least one mounting aperture; and the front surface is free of apertures other than the handle cover aperture and the at least one mounting aperture.

7. A cover as recited in claim 6, wherein:

the front surface of the cover plate in areas other than the handle cover aperture and the at least one mounting aperture is continuous and has uniform topography; and the cover plate is a single, solid component except for the handle cover aperture and the at least one mounting aperture.

* * * * *